Dec. 27, 1955 W. P. OEHLER ET AL 2,728,179
TRANSPORT DEVICE FOR DISK HARROWS
Filed Sept. 1, 1951 2 Sheets-Sheet 1

INVENTORS.
WILLIAM P. OEHLER
CHARLES H. YOUNGBERG
BY
ATTORNEYS

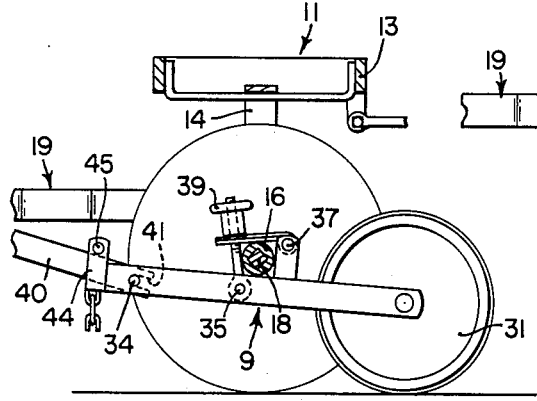
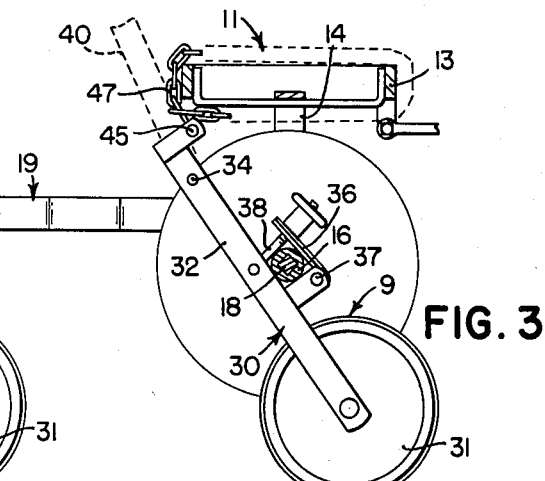
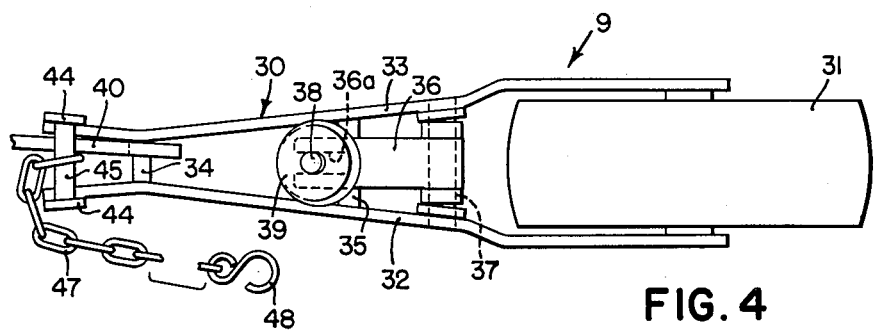
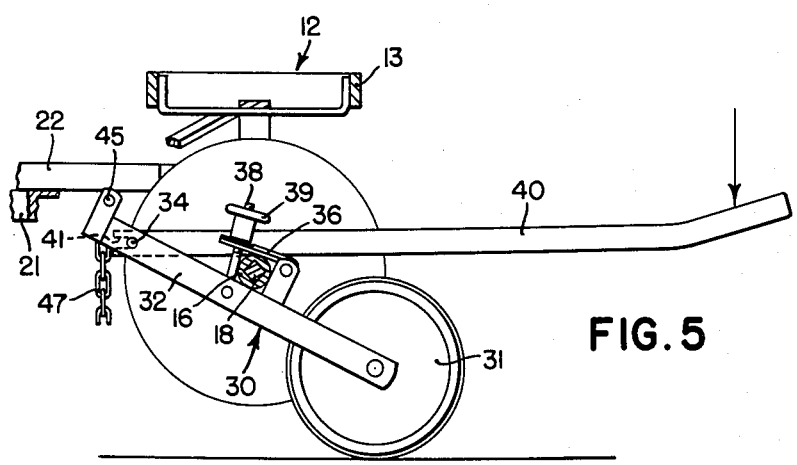

United States Patent Office 2,728,179
Patented Dec. 27, 1955

2,728,179

TRANSPORT DEVICE FOR DISK HARROWS

William P. Oehler and Charles H. Youngberg, Moline, Ill., assignors to Deere & Company, Moline, Ill., a corporation of Illinois Application September 1, 1951, Serial No. 244,748

1 Claim. (Cl. 55—73)

The present invention relates generally to agricultural implements and more particularly to disk harrows and the like.

The object and general nature of the present invention is the provision of a new and improved transport device for transporting the associated disk gang of the disk harrow from one place to another, as along or across roads, highways and the like, with the disks thereof held out of contact with the ground. More particularly, it is an important feature of this invention to provide a new and improved transport truck, one adapted to be detachably connected with each gang of a disk harrow, to provide for ready movement of the harrow with the disks held up out of engagement with the ground. It is a further feature of this invention to provide a transport device in the nature of a wheeled truck, one for each disk gang, with means providing for connection of each truck to the associated disk gang by means which can be operated from the front of the front gangs and from the rear of the rear gangs, whereby angling arms, levers and other members between the front and rear gangs do not interfere with the operation of bringing the trucks into position and locking them to the disk gang frames for transport. Specifically, it is a feature of this invention to provide a transport device in the form of a wheel-carrying frame and a separable handle adapted to be connected in vertically rigid relation with the frame from either the front or rear thereof when connecting the frame with the associated disk gang so that the wheel is, in each case, disposed in trailing relation. Where the wheels engage the ground in trailing relation with respect to the associated connections, the movement of the implement is much smoother and more steady than is the case where ground-engaging wheels are pushed along the ground rather than trailed.

These and other objects and advantages of the present invention will be apparent to those skilled in the art after a consideration of the following detailed description, taken in conjunction with the accompanying drawings in which:

Figure 2 is a sectional view, taken generally along the line 2—2 of Figure 1, showing one of the transport trucks associated with the front gangs in side elevation, with the operating handle in a position to raise the associated gang into its transport position.

Figure 3 is a view similar to Figure 2, showing the gang in its raised or transport position.

Figure 4 is a plan view of one of the transport devices as it appears when separated from the harrow, the detachable operating handle being shown in one of its two optional positions engaged in vertically rigid relation with the wheel frame of the transport device.

Figure 5 is a fragmentary sectional view taken along the line 5—5 of Figure 1, showing the operating handle in its other optional position, being the position in which the handle is used when raising the rear gangs, with the operating handle extending rearwardly of the harrow.

Figure 1:
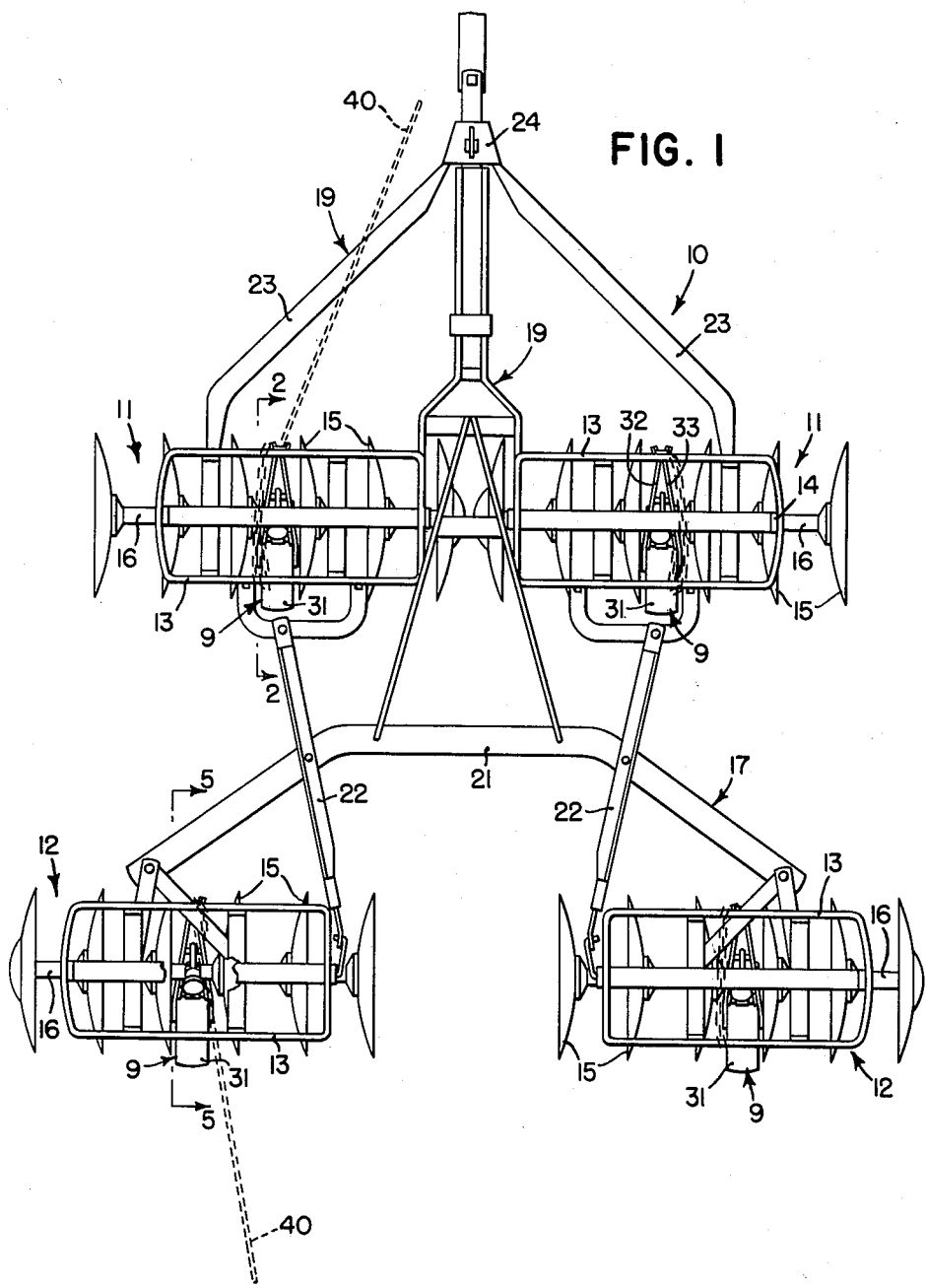
Figure 1 is a fragmentary plan view showing a double-action tandem disk harrow supported on transport devices, each of which is constructed according to the principles of the present invention.

Referring now to the drawings, the improved transport device is indicated in its entirety by the reference numeral 9 and is shown in the accompanying drawings as suporpting a double-action tandem disk harrow 10 having a pair of front gangs 11 and a pair of rear gangs 12. The details of the harrow 10 are per se conventional, so far as the present invention is concerned. Briefly, the front and rear gangs 11 and 12 of the harrow are substantially identical and each comprises a gang frame 13 connected at its ends to vertical standards 14, the lower ends of which are connected through suitable bearing means with a gang of disks 15 mounted in the usual way on a square gang bolt 18 and maintained in spaced apart relation by spacing sleeves or spools 16. The front and rear gangs 11 and 12, together with a main frame 17 and associated parts, make up the double-action tandem harrow 10. The laterally inner ends of the front gangs 11 are pivotally connected to the rear end of a draft frame 19 and the laterally outer ends of the rear gangs 12 are connected with the outer ends of a transverse frame bar 21 which forms a rigid portion of the frame 17. The laterally inner ends of the rear gangs 12 are connected by angling links 22 to the outer end portions of the front gangs 11, which end portions are also connected to forwardly and inwardly extending draft links 23. The forward ends of the latter links are connected to a slide 24 which is shiftable generally longitudinally relative to the draft structure 19, and by shifting the slide in one direction or the other relative ot the main draft frame 19, the front gangs 11 are shifted between straightened and angled positions, and the rear gangs 12 are likewise shifted, since they are connected with the front gangs by the links 22. For transport, the gangs 11 and 12 normally are swung into their straightened position, as indicated in Figure 1, whereby the disks 15 readily roll along the ground. However, when the harrow is to be transported for long distances, especially over hard surfaced roads and highways, it is extremely undesirable to have the disks roll along the ground surface, since the cutting edges thereof wear rapidly and soon become dull.

The transport device 9 of the present invention comprises a wheel frame 30 to one end of which a ground-engaging wheel 31 is connected by suitable axle and journal means. The wheel frame 30 preferably comprises a pair of laterally spaced apart bars 32 and 33, the bars at the end of the wheel frame opposite the wheel 31 being maintained in spaced apart relation by a cross pin 34 rigidly secured, as by welding, to the bars 32 and 33. The wheel frame 30 is adapted to be releasably connected intermediate its ends with the associated spacer 16 by means of a clamping member 36 that is swingably mounted at one end on a pin 37 carried by clips or the like fixed to the bars 32 and 33. The other end of the clamping member 36 is bifurcated, as at 36a (Figure 4), to receive a swing bolt 38 which is pivotally connected at its lower end with the wheel frame bars, as by a cross pin 35 fixed at its ends to the bars 32 and 33. A nut member 39 is threaded onto the swing bolt 38 and is adapted to act against the slotted end of the clamping member 36 for fixedly connecting the wheel frame 30 to the associated disk gang spacing sleeve 16.

A detachable operating handle 40 is provided at one end with a slot 41 dimensioned so as to be readily engageable with the cross pin 34 in either of two optional positions, one with the handle brought into position from the front of the wheel frame 30 (Figures 2 and 3) and the other position with the handle brought into position from the rear of the wheel frame (Figure 5). The forward ends of the wheel frame bars 32 and 33 carry clips 44 by which an abutment member in the form of a cross pin 45 is rigidly secured to the wheel frame 30, the cross pin 45 being disposed forwardly of and above the adjacent handle-receiving cross pin 34. The cross pins 34 and 45 are so fixed, one relative to the other, that after the wheel frame has been brought into the position shown in Figure 2, as by moving the wheel frame into a position underneath the associated gang from the rear thereof, the handle member 40 may be inserted into position in the wheel frame 30 from the front, the slotted end 41 engaging over the pin 34 and the upper edge of the handle 40 engaging the upper and forward cross pin 45. The handle member 40 in this position extends upwardly and forwardly and clears the adjacent angling link 23 and other parts of the disk harrow frame. The operator may then stand at the front of the harrow and lift up on the outer end of the arm 40. The handle and wheel frame act as a rigid lever, whereby the lifting force exerted by the operator serves to raise the associated gang, acting about the ground-engaging wheel 31 as a fulcrum, into a transport position (Figure 3). After the gang has been raised, the wheel frame 30 is locked in its transport position by means of a flexible chain or similar element, indicated by the reference numeral 47, one end of the chain being connected with the cross pin 45 and the other end of the chain including a hook 48 or the like by which said other end may be engaged with any convenient adjacent portion of the harrow, preferably one of the cross bars or main bars of the associated gang frame 13. Thus, after the wheel frame has been locked by the chain 47 the handle member 40 may be moved away from the wheel frame 30 and used with the wheel frame associated with one of the other gangs, such as one of the rear gangs 12, best shown in Figure 5. When applying the transport device 9 of the present invention to the rear gangs 12, it is desirable to be able to insert the operating handle into position from the rear of the rear gangs, thereby making it unnecessary for the operator to work the handle from a position between the gangs, where the angling levers and other portions of the frame or other parts of the harrow may seriously interfere with the proper manipulation of the handle. Therefore, according to the principles of the present invention, we have provided means whereby the same operating handle 40, used with the transport truck frame for supporting the front gang, is also readily usable, and from the rear of the harrow, with the transport wheel frame associated with the rear gang. As best shown in Figure 5, when bringing the operating handle 40 into position from the rear of the harrow, the slot 41 in the handle 40 is engaged with the cross pin 34 and the lower edge of the handle then brought down into engagement with the associated disk spacer or spool 16, whereupon downward pressure may be applied to the rear end of the handle 40 so that the latter, with the associated wheel frame 30, again becomes a rigid lever acting about the associated ground wheel 31 as a fulcrum for raising the rear gang conveniently and easily from a position in rear of the rear gang. After the front end of the wheel frame has been elevated a distance sufficient to raise the associated disks out of contact with the ground, the outer end of the chain 47 is looped around an adjacent portion of the harrow, such as one of the bars of the gang frame, and then secured in position, whereupon the rear gang is held in transport position and the operating handle 40 may be removed from the wheel frame. It is to be noted that, although the handle may be used from a forward position in front of the front gangs for raising the latter into their transport position and likewise the handle 40 may be operated from a position in rear of the rear gangs, when raising the latter, in each case the ground wheel of each front and rear transport truck is disposed in a trailing position relative to the associated gang supported thereby. Thus, with the wheels in a trailing position, the harrow may readily be transported from place to place smoothly and without the wheels oscillating or tending to oscillate, as would occur if an attempt were made to push the wheels, rather than trail them.

While we have shown and described above the preferred structure in which the principles of the present invention have been incorporated, it is to be understood that our invention is not to be limited to the specific means which we have herein shown and described, but that, in fact, widely different means may be employed in the practice of the broader aspects of our invention.

What we claim, therefore, and desire to secure by Letters Patent is:

A transport device for tandem disk harrows of the type including a plurality of front and rear gangs, each arranged with spacing spools between the disks, said transport device comprising a plurality of elongated wheel frames, a wheel journaled on each frame adjacent one end portion thereof, means on each frame intermediate its ends for rockably receiving a spacing spool of a disk harrow, an operating handle separable from each frame and each handle having a notch at one end, a part on the other end portion of each wheel frame for detachably receiving the notched end of the associated handle in either of two generally opposite positions, said part being spaced inwardly from the end of said wheel frame opposite said wheel, one handle being disposable over the adjacent spacing spool of the rear gang of the harrow from the rear of the rear gang and having the notch of the handle insertable over said part, whereby a downward force exerted on the rear end of the handle will raise the rear gang relative to the associated wheel to a position above and forward of the wheel so that the wheel will trail, a second part at said end of each wheel frame opposite the wheel thereof, said second handle receiving part detachably receiving said handle and located adjacent said handle-receiving part so that the handle of a second wheel frame may be attached from the front of a front gang to the associated wheel frame under the front gang by passing the notched portion of the handle under said second part and engaging the notch of the handle with said first part of the associated wheel frame from the front of the harrow, whereby an upward force exerted on the outer end of the handle of the second frame will raise the front gang relative to the associated wheel to a position above and forward of the wheel so that the wheel will trail, and locking means connectible between the forward portion of each wheel frame and the associated gang for holding the associated wheel in a position below and rearwardly of the associated disk axis.

References Cited in the file of this patent

UNITED STATES PATENTS

| | | |
|---|---|---|
| 1,901,183 | McKahin | Mar. 14, 1933 |
| 2,164,550 | Steward | July 4, 1939 |
| 2,456,868 | Dominic | Dec. 21, 1948 |
| 2,493,230 | Dilley | Jan. 3, 1950 |
| 2,496,153 | Eaves, Jr., et al. | Jan. 31, 1950 |
| 2,517,160 | Alphin, Jr. | Aug. 1, 1950 |
| 2,526,186 | Allen et al. | Oct. 17, 1950 |
| 2,587,510 | Neikirk | Feb. 26, 1952 |

FOREIGN PATENTS

| | | |
|---|---|---|
| 981,702 | France | Jan. 17, 1951 |